United States Patent
Chen et al.

(10) Patent No.: US 7,305,224 B2
(45) Date of Patent: Dec. 4, 2007

(54) POWER SAVING WIRELESS MOUSE HAVING RECEIVER RECEPTACLE

(76) Inventors: Hsiang-Hsiung Chen, 3F-5, No. 547, Kuang Fu South Rd., Hsin I District, Taipei City (TW); Hang Lu, 3F-5, No. 547, Kuang Fu South Rd., Hsin I District, Taipei (TW)

( * ) Notice: Subject to any disclaimer, the term of this patent is extended or adjusted under 35 U.S.C. 154(b) by 420 days.

(21) Appl. No.: 11/138,526

(22) Filed: May 27, 2005

(65) Prior Publication Data

US 2006/0267942 A1    Nov. 30, 2006

(51) Int. Cl.
*H04B 1/16* (2006.01)
*H04B 7/00* (2006.01)
*G06F 3/033* (2006.01)

(52) U.S. Cl. .................. 455/343.1; 455/41.2; 455/574; 345/163

(58) Field of Classification Search ............... 455/41.1, 455/41.2, 41.3, 574, 343.1, 556.1, 557; 345/157, 345/158, 163
See application file for complete search history.

(56) References Cited

U.S. PATENT DOCUMENTS

| | | | |
|---|---|---|---|
| 5,854,621 A * | 12/1998 | Junod et al. | 345/158 |
| 5,881,366 A * | 3/1999 | Bodenmann et al. | 455/41.2 |
| 7,136,046 B2 * | 11/2006 | Su | 345/163 |
| 7,154,475 B2 * | 12/2006 | Crew | 345/163 |

* cited by examiner

*Primary Examiner*—Quochien B. Vuong
(74) *Attorney, Agent, or Firm*—Leong C. Lei

(57) ABSTRACT

A wireless mouse having a receptacle for the storage of the wireless receiver is provided. The wireless mouse has a power saving device configured such that it would be triggered to switch the wireless mouse into a power saving mode when the wireless receiver is stored in the receptacle. In the power saving mode, only a small amount of electricity is drawn to maintain the memory of the earlier configured and established identification code and the communication link. When the wireless receiver is removed from the receptacle, the power saving device is triggered to switch the wireless mouse back to a normal operation mode and the memorized identification code and communication link are used automatically to communication with the wireless receiver directly and immediately.

2 Claims, 4 Drawing Sheets

POWER SAVING WIRELESS MOUSE HAVING RECEIVER RECEPTACLE

TECHNICAL FIELD OF THE INVENTION

The present invention generally relates to the wireless mouse, and more particularly to a wireless mouse having a receptacle for the storage of its receiver and having a power saving mode for memorizing identification code and communication link when not in use.

DESCRIPTION OF THE PRIOR ART

Wireless mouse has gained widespread popularity as it provides a greater degree of freedom to mouse operation and the user has one less cable to manage. However, the price to pay is that a wireless receiver has to be installed on the computer so as to receive RF signals emitted from the wireless mouse pertaining to its movement and button status.

Earlier wireless mouse and its wireless receiver are designed separately; when they are not in use, they are stored independently. Recently, there are some designs of the wireless mouse which configure a receptacle on the mouse body to house the wireless receiver when the wireless mouse is not in use.

Before using a wireless mouse, whether it has a receptacle for the wireless receiver or not, an identification code for the wireless mouse must be set up and a communication link must be established between the wireless mouse and receiver. Typically, this is conducted by pressing a link button on the wireless receiver and a code setup button on the wireless receiver so that the two are triggered to engage with each other in a code setup and link establishment process.

On the other hand, a wireless mouse usually draws the required electricity from an internal battery and has a power button usually configured at the bottom of the wireless mouse. When the wireless mouse is not in use, it could be turned off manually using the power button so as to save the battery electricity. Then, to use the wireless mouse, it has to be turned on manually using the power button again. The problem is that, once the wireless mouse is turned off, the earlier configured identification code and established communication link would be lost altogether and, therefore, the code setup and link establishment process has to be repeated every time the wireless mouse is turned off and then turned back on again later.

For some wireless mouse with receptacle, the wireless mouse is automatically turned off when the wireless receiver is stored in the receptacle and, thereby, triggers an internal mechanical switch to turn off the wireless mouse. Later when the wireless receiver is removed from the receptacle, the internal mechanical switch is triggered to turn on the wireless mouse automatically. Despite the improved convenience, such a wireless mouse suffers the same problem of repetitive code setup and link establishment process every time the wireless mouse is turned off and then turned back on again later. This is especially troublesome when the code setup button and/or the link button is configured so small that usually a pointed object (such as a pencil) is required to press these buttons.

SUMMARY OF THE INVENTION

The primary purpose of the present invention is to provide a wireless mouse which could be triggered to enter a power saving mode so that, when it is not in use, the earlier configured identification code and established communication link to the wireless receiver are stored and memorized. When the wireless mouse is returned to a normal operation mode, it will directly resume working using the stored identification code and communication link.

To fulfill the foregoing purpose, the present invention provides a power saving device inside the wireless mouse. The power saving device is configured such that it would be triggered to switch the operation mode of the wireless mouse from the normal operation mode to the power saving mode when the wireless receiver is stored in the receptacle of the wireless mouse. In the power saving mode, a small amount of electricity that is not enough for the normal operation of the wireless mouse is drawn from the internal battery of the wireless mouse to maintain the memory of the identification code and the communication link. When the wireless receiver is removed from the receptacle, the power saving device is triggered to switch the wireless mouse back to the normal operation mode and the memorized identification code and communication link are used automatically to communication with the wireless receiver directly and immediately.

The present invention provides the following advantages. The receiver receptacle provides a convenient and safe storage of the wireless receiver when the wireless mouse is not in use and when carrying the wireless mouse. In addition, by means of the receiver receptacle, the wireless mouse could be automatically switched between the normal operation mode and the power saving mode, which conveniently and effectively conserves the electricity of the wireless mouse's internal battery. Furthermore, the power saving mode of the wireless mouse allows the wireless mouse to memorize the earlier configured and established identification code and communication link so that, when the wireless mouse is switched back to the normal operation mode, re-configuring the identification code and re-establishing the communication link are avoided.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
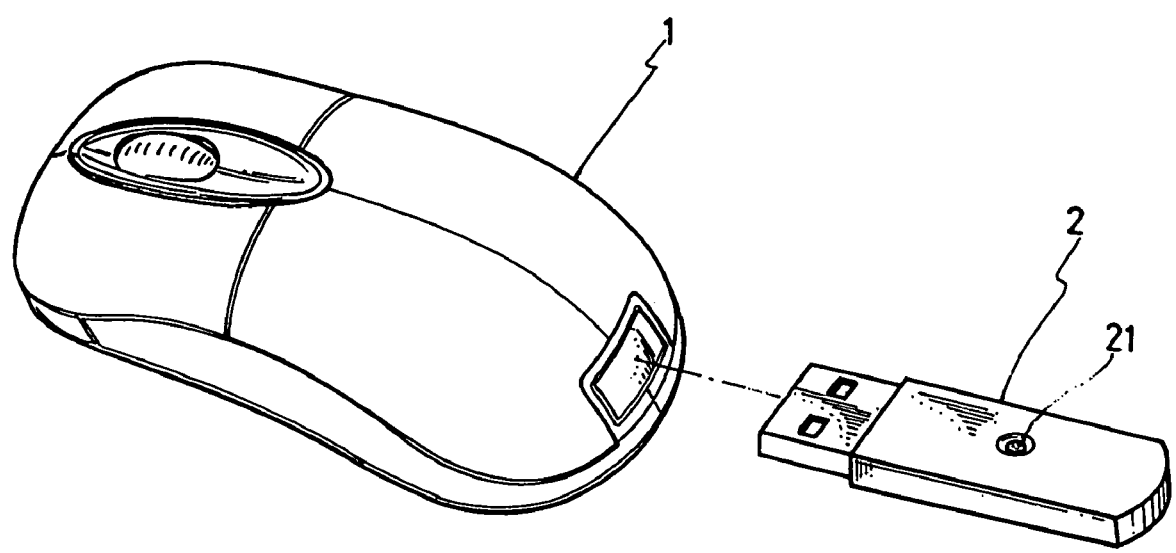
FIG. 1 is a schematic view showing the outlook of a wireless mouse and a wireless receiver according to an embodiment of the present invention.
Figure 2:
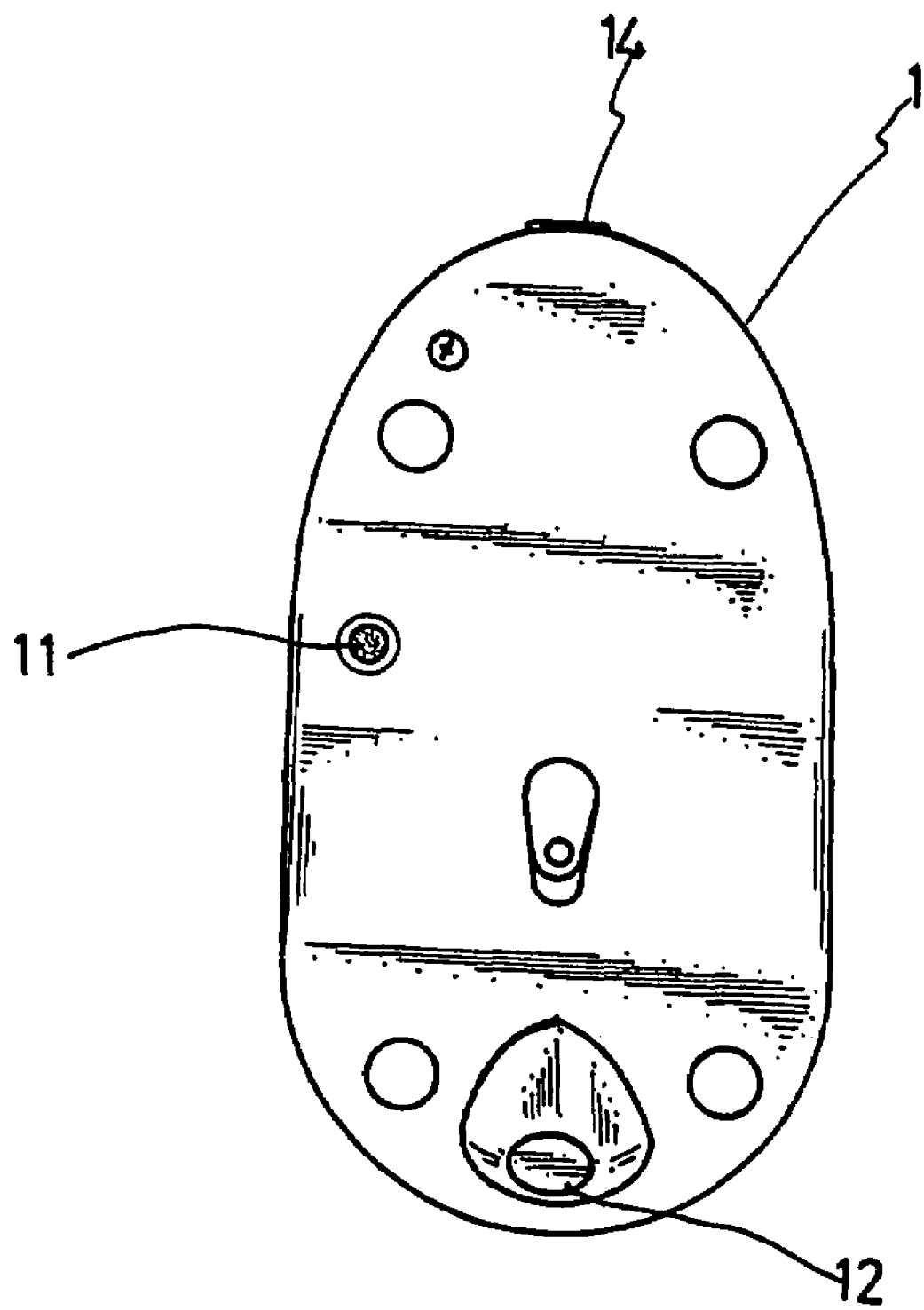
FIG. 2 is a schematic bottom view of the wireless mouse of FIG. 1.
Figure 3:
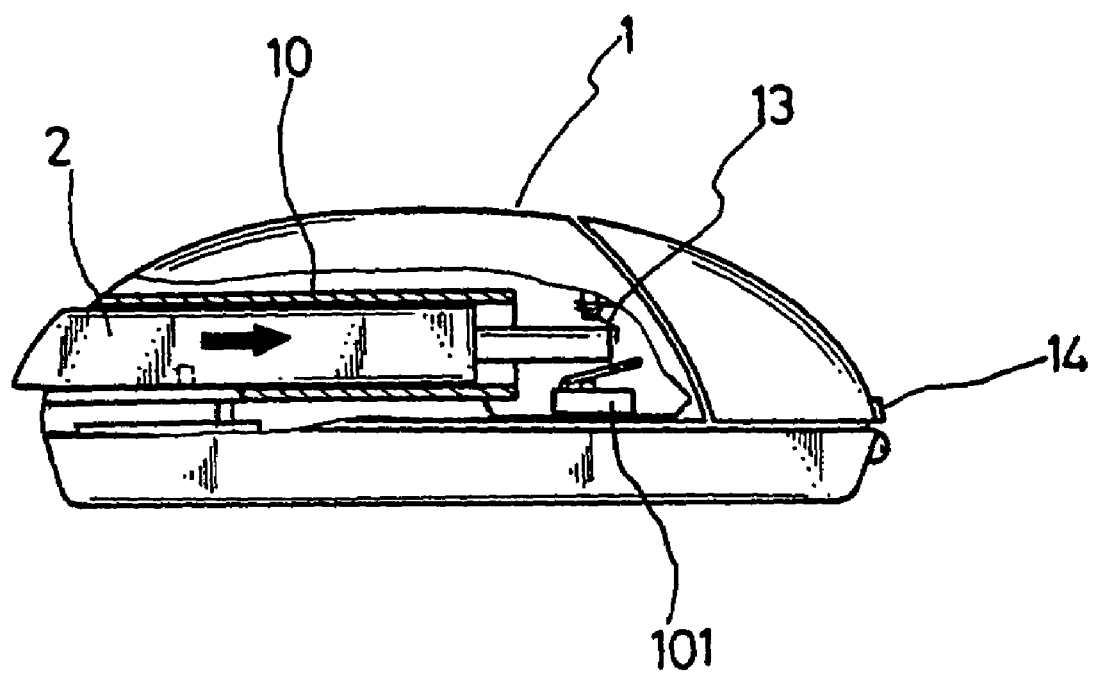
FIG. 3 is a sectional view showing the wireless receiver stored inside the wireless mouse of FIG. 1.

Please refer to FIGS. 1 and 3. As illustrated, a wireless mouse 1 according to the present embodiment has a receptacle 10 which a wireless receiver 2 could be stored inside. The wireless mouse 1 is therefore easy to carry without worrying losing the wireless receiver 2. For ease of reference, the side of the wireless mouse 1 where the receptacle 10's opening (not numbered) is located is referred to as the rear side and the side opposite to receptacle opening is referred to the front side, hereinafter. Please also refer to FIG. 2. At the bottom of the wireless mouse 1 and on a side of the wireless receiver 2, there are a code setup button 11 and a link button 21 respectively. By pressing the code setup button 11 and the link button 21, the wireless mouse 1 and receiver 2 would setup their identification code and establish a communication link therebetween. At the end of the receptacle 10 deep inside the wireless mouse 1, there is a power switch 101 configured such that, when the wireless receiver 2 is stored or removed, the power switch 101 would be turned off or on automatically. Also at the bottom of the wireless mouse 1 and close to the rear end of the receptacle 10, there is an eject button 12 configured such that, when it is engaged, the wireless receiver 2 would be expelled out of the receptacle 10 by a spring element 13 inside the wireless mouse 1.

At the front end of the wireless mouse 1, there is a charging connector 14 for connecting to an external power source (not shown) via an appropriate cable (not shown) so as to charge an internal chargeable battery. In the present embodiment, the charging connector 14 is a Universal Serial Bus (USB) mini 5-pin connector and, by connecting a computer's USB port to the charging connector 14 using an USB cable, the wireless mouse 1 is able to draw electricity from the computer's USB port to charge the internal chargeable battery of the wireless mouse 1.

Figure 4:
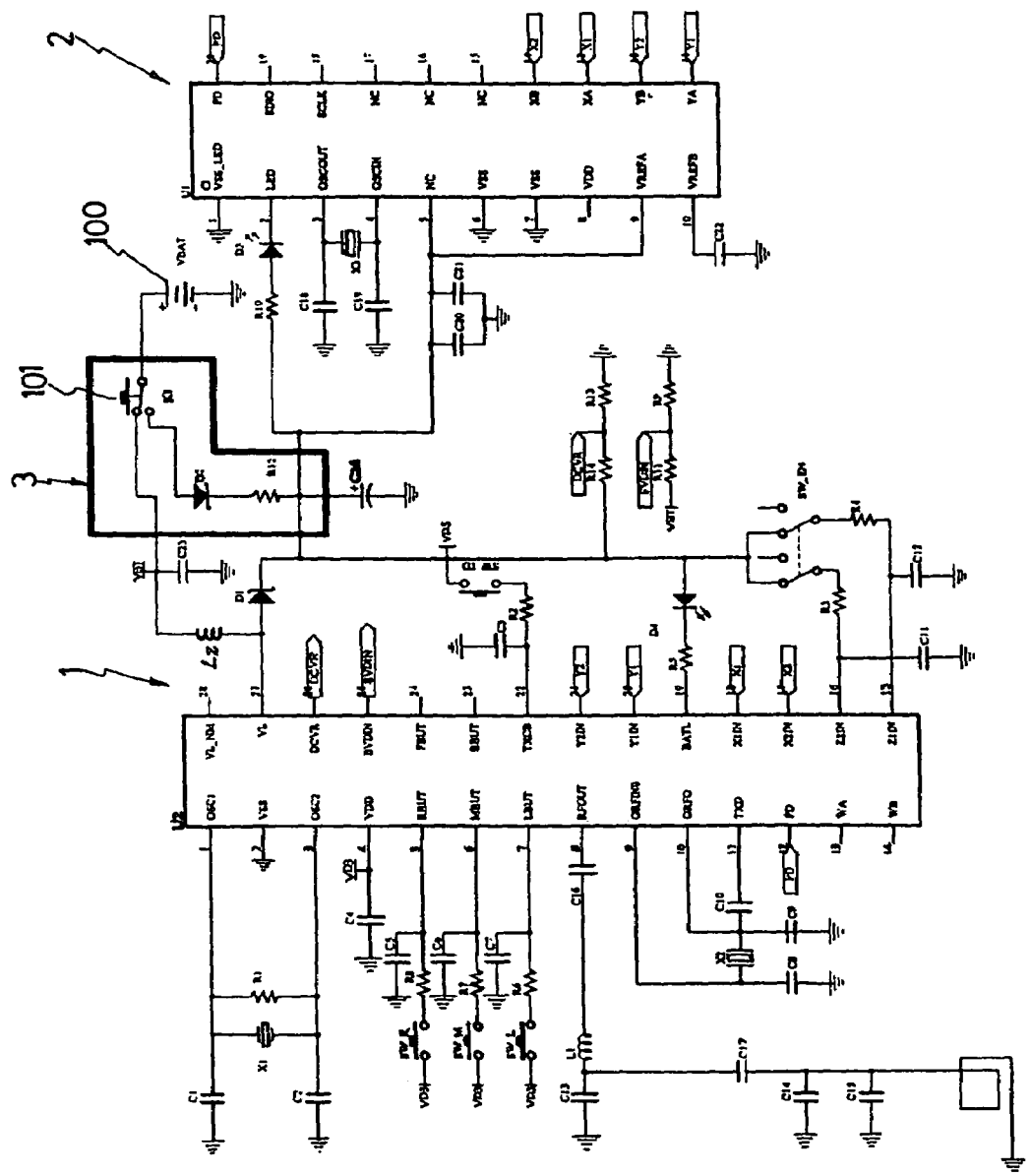
FIG. 4 is a circuit layout showing the internal circuits of the wireless mouse and the wireless receiver according to an embodiment of the present invention.

FIG. 4 is a circuit layout showing the internal circuits of the wireless mouse 1 and the wireless receiver 2 according to an embodiment of the present invention. Within the wireless mouse 1's circuit, in the normal operation mode, the transmitter chip 15 is driven by a normal operating voltage. In the present embodiment which is powered by two 1.5V batteries, the normal operating voltage is 3V. When the operating voltage drops below a threshold, say 2.5V, the wireless mouse 1 would enter the power saving mode which uses minimum electricity to maintain the wireless mouse 1's memory of the identification code and communication link of the wireless mouse 1 and receiver 2. The operating voltage could be as low as 0.6 V in the present embodiment. When the operating voltage of the wireless mouse 1 returns to the normal operating voltage (i.e., 3V), the wireless mouse 1 is automatically switched from the power saving mode to the normal operation mode, and the memorized identification code and communication link is automatically used for the transmission to the wireless receiver 2.

A section of the circuit shown in FIG. 4 marked by the black box is a power saving device 3. When the wireless receiver 2 is not plugged into the receptacle 10 of the wireless mouse 1, the electricity from the battery 100 passes through the mechanical switch K1 (101) and reaches the point VBT. The electricity then goes through inductor L2, diode D1, capacitor C24 for a DC conversion, and a stable DC voltage around 3V is established across the capacitor C24 so as to keep the normal operation of the wireless mouse 1. When the wireless receiver 2 is stored in the receptacle 10, the mechanical switch K1 (101) is pressed so that the electricity from the battery 100 is directed to the anode of diode D2 and reaches capacitor C24 via the resistor R12. The inductor L2 receives no electricity and therefore cannot perform DC conversion. The introduction of the resistor R12 and the diode D1 causes the voltage across the capacitor C24 to be lower than the normal operating voltage of the wireless mouse 1. For example, assuming that the battery 100 provides a voltage around 3.2 V, and diode D2 provides a voltage drop around 0.6~0.7 V, a reasonable choice of the resistor R12 would bring the voltage across the capacitor C24 below 2.5 V As such, the wireless mouse 1 would enter the power saving mode and a small amount of electricity is drawn to maintain the memory of the identification code and communication link.

On the other hand, when the wireless receiver 2 is ejected and removed from the receptacle 10, the mechanical switch K1 (101) resumes its normal position causing the voltage across the capacitor C24 returns to the normal operating voltage (3V). As such, the wireless mouse 1 automatically resumes its working.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A wireless mouse powered by an internal power source for a computing device operating along with a wireless receiver detachably installed on said computing device by transmitting RF signals to said wireless receiver over an identification code and a communication link configured and established between said wireless mouse and said wireless receiver, said wireless mouse characterized in that:

said wireless mouse has a receptacle for the storage of said wireless receiver;

said wireless mouse has a spring device inside said wireless mouse and an eject button on said wireless mouse configured such that, when said eject button is engaged, said wireless receiver stored inside said receptacle is expelled out of said receptacle by said spring device;

said wireless mouse operates in a normal operation mode when an operating voltage provided by said internal power source is around a pre-determined normal operating voltage;

said wireless mouse enters a power saving mode from said normal operation mode when said operating voltage provided by said internal power source drops below a pre-determined threshold, said power saving mode conserves the energy of said internal power source by drawing only the required power for memorizing said identification code and said communication link;

said wireless mouse resumes said normal operation mode when said operating voltage is restored around said normal operating voltage and said memorized identification code and communication link are used directly for communicating with said wireless receiver; and said wireless mouse has a power saving device inside said wireless mouse configured such that the storage of said wireless receiver into said receptacle triggers said power saving device to switch said wireless mouse to operate in said power saving mode, and the removal of said wireless receiver from said receptacle triggers said power saving device to switch said wireless mouse to operate in said normal operation mode.

2. The wireless mouse according to claim 1, wherein said wireless mouse having an USB mini 5-pin connector for connecting to an external power source to charge said internal power source.

* * * * *